United States Patent
Cudworth et al.

(10) Patent No.: US 10,464,722 B2
(45) Date of Patent: Nov. 5, 2019

(54) VALVE ASSEMBLY

(71) Applicant: Jackel International Limited, Northumberland (GB)

(72) Inventors: Nicholas Cudworth, Northumberland (GB); Paul Schofield, Cramlington (GB); Andrew Mattocks, Tyne and Wear (GB)

(73) Assignee: Mayborn (UK) Limited, Newcastle Upon Tyne (GB)

( * ) Notice: Subject to any disclaimer, the term of this patent is extended or adjusted under 35 U.S.C. 154(b) by 44 days.

(21) Appl. No.: 15/509,919

(22) PCT Filed: Sep. 10, 2015

(86) PCT No.: PCT/GB2015/052616
§ 371 (c)(1),
(2) Date: Mar. 9, 2017

(87) PCT Pub. No.: WO2016/038371
PCT Pub. Date: Mar. 17, 2016

(65) Prior Publication Data
US 2017/0275062 A1    Sep. 28, 2017

(30) Foreign Application Priority Data
Sep. 10, 2014    (GB) .................................. 1416043.6

(51) Int. Cl.
*B65D 47/08*    (2006.01)
*A47G 19/22*    (2006.01)
(Continued)

(52) U.S. Cl.
CPC ..... *B65D 47/0866* (2013.01); *A47G 19/2266* (2013.01); *A47G 19/2272* (2013.01);
(Continued)

(58) Field of Classification Search
CPC .............. B65D 47/2018; B65D 47/248; B65D 47/0866; A47G 19/2266
See application file for complete search history.

(56) References Cited

U.S. PATENT DOCUMENTS

| 4,138,033 A * | 2/1979 | Payne ................ B65D 47/2018 |
| | | 220/254.3 |
| 4,184,603 A * | 1/1980 | Hamilton, Sr. .... A47G 19/2272 |
| | | 220/254.5 |

(Continued)

FOREIGN PATENT DOCUMENTS

| CN | 1326325 | 12/2001 |
| DE | 202004009722 | 9/2004 |

(Continued)

OTHER PUBLICATIONS

Written Opinion of International application No. PCT/GB2015/052616.

*Primary Examiner* — Shawn M Braden
(74) *Attorney, Agent, or Firm* — Olson & Cepuritis, Ltd.

(57) ABSTRACT

Disclosed herein is a valve assembly for a feeding or drinking vessel. The valve assembly comprises a valve seat surface (229), and a valve element having a valve face opposing said valve seat surface (229), a center axis and a rim (232). The valve element further comprises a biasing element (242) configured such that, in a rest position, the valve face is biased against the valve seat surface (229), wherein the valve element rim (232) is arranged to be anchored and the biasing element (242) is arranged intermediate the valve element center axis and rim (232).

20 Claims, 13 Drawing Sheets

(51) Int. Cl.
  *F16K 7/12* (2006.01)
  *F16K 15/14* (2006.01)
  *B65D 41/04* (2006.01)
  *A61J 9/00* (2006.01)

(52) U.S. Cl.
  CPC ............... *B65D 41/04* (2013.01); *F16K 7/12* (2013.01); *F16K 15/144* (2013.01); *A61J 9/00* (2013.01)

(56) References Cited

U.S. PATENT DOCUMENTS

| | | | |
|---|---|---|---|
| 5,747,083 A | 5/1998 | Raymond et al. | |
| 6,202,877 B1* | 3/2001 | La Torre | A47G 19/2272 220/254.1 |
| 8,272,525 B1* | 9/2012 | La Torre | A47G 19/2272 220/254.1 |
| 8,453,870 B2* | 6/2013 | Berg | A47G 19/2272 215/311 |
| 9,149,138 B2* | 10/2015 | Miller | A47G 19/22 |
| 9,241,588 B2* | 1/2016 | Dunn | A47G 19/2272 |
| 9,504,342 B2* | 11/2016 | Chan | A47G 19/2272 |
| 9,555,938 B2* | 1/2017 | Syrkos | A47G 19/2272 |
| 2004/0060598 A1* | 4/2004 | Danby | A45F 3/16 137/508 |
| 2007/0167058 A1 | 7/2007 | Mijers et al. | |
| 2010/0059525 A1* | 3/2010 | Smith | B65D 47/06 220/523 |
| 2011/0079300 A1* | 4/2011 | Kneer | B65D 47/18 137/511 |
| 2017/0275062 A1* | 9/2017 | Cudworth | A47G 19/2272 |

FOREIGN PATENT DOCUMENTS

| | | |
|---|---|---|
| DE | 102009048476 | 9/2010 |
| EP | 0247824 | 12/1987 |
| EP | 2138075 | 12/2009 |
| WO | 0022969 | 5/2000 |
| WO | 2004092624 | 10/2004 |
| WO | 2014033232 | 3/2014 |

\* cited by examiner

VALVE ASSEMBLY

This disclosure relates to a valve assembly, and in particular to a valve assembly for a feeding vessel or drinking vessel for example an infant drinking cup.

BACKGROUND

Cup assemblies for use by infants often comprise a spout or nipple, and include a valve which can be opened via the application of negative pressure by suction on the spout or nipple by the infant. Typically, a flexible valve member blocks fluid flow in a rest position, and the application of negative pressure by the infant (i.e. sucking) causes the flexible valve member to flex, move or invert to allow fluid flow. However, such a valve arrangement can have several disadvantages. Suction operated valves are often subject to leaks; as the valve must be opened by the application of negative pressure by an infant, the valve must necessarily have a relatively small sealing force and can be easily inadvertently opened. For example, liquid can impact the valve member from within the cup and act to push the flexible part of the valve open, especially when the cup is vigorously shaken, inverted, or when the cup is accidentally dropped. Furthermore, the infant is restricted to drinking from the spout. This requires the infant to hold the cup in a certain orientation. The functionality offered by such a cup does not prepare the infant for using 'open ended' cups, from which the infant will be expected to drink as an adult.

It has been appreciated that a drinking cup assembly having a valve which is operated by direct contact pressure from the lips of an infant can mitigate some of the above detailed problems. This arrangement not only allows a stronger seal to be provided, but can also be designed such that the infant can drink from any point around a rim of the cup. Known lip-openable valve assemblies typically comprise a disc-shaped cap or actuator located above a valve arrangement with a high degree of circular symmetry. A central circular valve member is anchored at a central cylindrical axis of the cup, and in a rest position the circular valve member is biased to block apertures in the valve assembly, or seal against an inner surface of the circumference of the cup, in such a manner that fluid flow from the cup is prevented. Biasing of the valve arrangement is typically provided by biasing means located at the central anchoring location of the circular valve member. When a user wishes to drink from the cup, he or she pushes an upper surface of the cap downwards with their lips. The cap is rigidly attached to the circular valve member, and therefore this movement causes the circular valve member to pivot or bend about its central anchoring location, causing the apertures to be unblocked or a fluid flow path to be otherwise created. However such arrangements tend to provide poor seals and/or are difficult to actuate, and additionally prove to leak when shaken.

EP1123027B1 describes a drinking container of this general type having a lid with a valve which is openable by a user's lips.

The present invention seeks to address these and other disadvantages encountered in the prior art by providing an improved valve assembly for a drinking cup.

SUMMARY

An invention is set out in the independent claims. Optional features are set out in the dependent claims.

FIGURES

Specific embodiments are now described with reference to the drawings, in which.

DETAILED DESCRIPTION

Figure 1A:
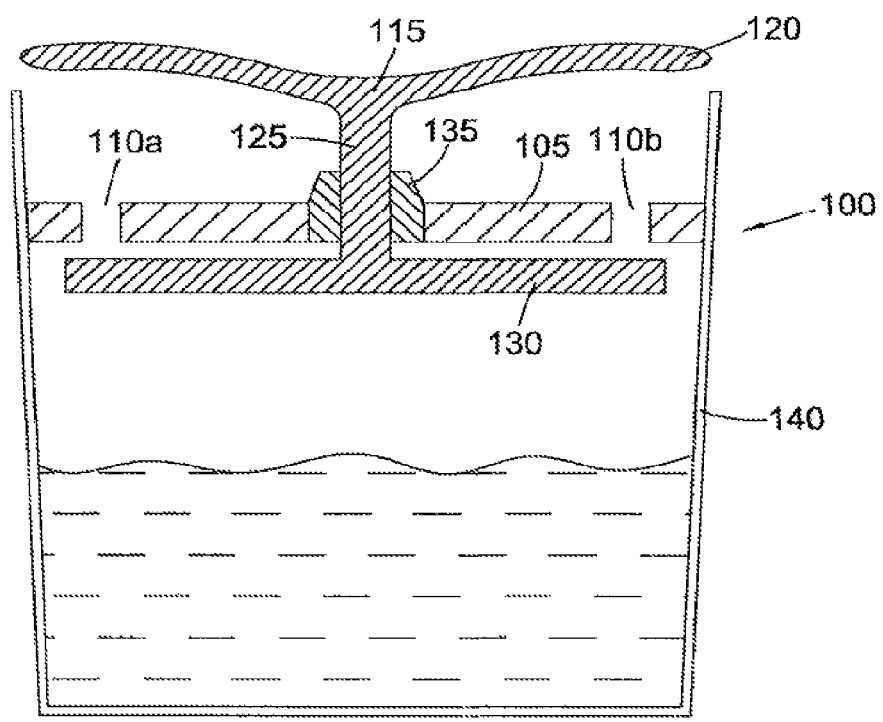
FIGS. 1a and 1b depict a cup and valve assembly in accordance with the prior art.
Figure 1B:
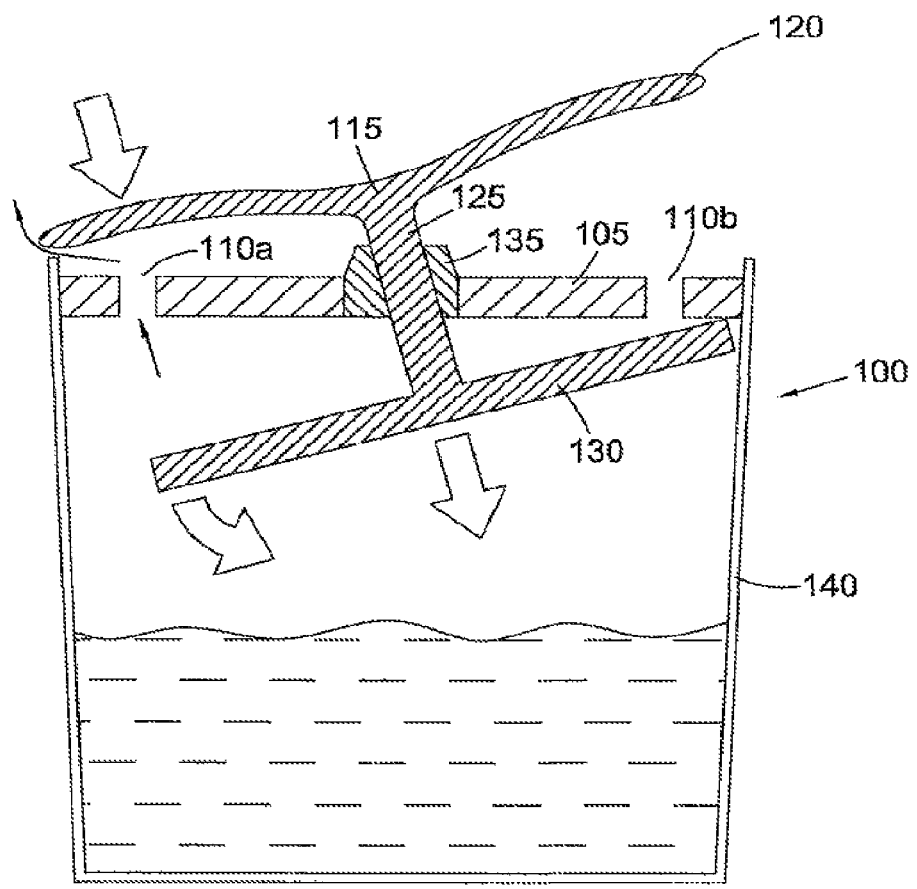

FIGS. 1a and 1b depict a drinking cup assembly 100 in accordance with the prior art. FIG. 1a shows the prior art drinking cup assembly in a closed position. Fluid is contained within the cup 140. A central structure 105 has a number of apertures 110a and 110b. A disc-shaped cap 115 having a periphery 120 is coupled by a central shaft 125 to a circular valve member 130. The central shaft 125 passes through the centre of the central structure 105 to define a central anchoring location. Biasing means 135, for example a conical region of resilient material, acts from the central anchoring location. The biasing means acts to hold the circular valve member against the underside of the apertures in the central structure, thereby creating a seal.

When a user applies contact pressure to the periphery 120 of the disc-shaped cap 115, the shaft moves down, collapsing and against the bias supplied by the biasing means 135, and the circular valve member 130 pivots about a central cylindrical axis of the cup. The circular valve member 130 moves away from at least one aperture 110a, thereby creating a fluid flow path from the cup to the mouth of the user.

Any force which acts against the bias of the cup creates bending moments which act about the central anchoring location, and these bending moments increase in magnitude with radial distance from the central anchoring location. In order that liquid can exit the cup when the user tips up the cup and opens the valve the apertures 110 need to be at or near the periphery of the central structure 105 and, consequently, the valve member 130 must have a large diameter so that it extends to cover the apertures. However, because the distance from the apertures 110 to the central anchoring location is relatively large, the moment produced by the weight of the corresponding circular valve member 130 is relatively large. These moments provide forces that act against the bias provided by the centrally located biasing means 135, and therefore the seal can be easily breached when the cup is shaken, inverted or dropped. To support the rigid circular valve member, the biasing means must be strong, and the entire valve structure must be held in place via a rigid central structure. The circular valve member must also be relatively rigid, to prevent the outer surfaces of the circular valve member from 'drooping' and thus compromising the valve. Thus the prior art cup arrangements either provide weak seals which are easily breached by bending moments acting on the circular valve member at the periphery of the cup, or must be strengthened with stiff, strong biasing means and rigid supporting structures to prevent this from occurring. Unfortunately, strong, stiff biasing means and rigid supporting structures will make it difficult for the user to operate the valve. Further, this arrangement also means that, upon lip pressure from a user, a large section of the peripheral flange disengages from the valve seat, meaning that a large region which allows fluid flow is created. This means that a large volume of fluid can flow from the cup when the valve is in an open position, and therefore it can be hard for an infant to control fluid flow, and fluid may spill from the sides of the infant's mouth.

Figure 2A:
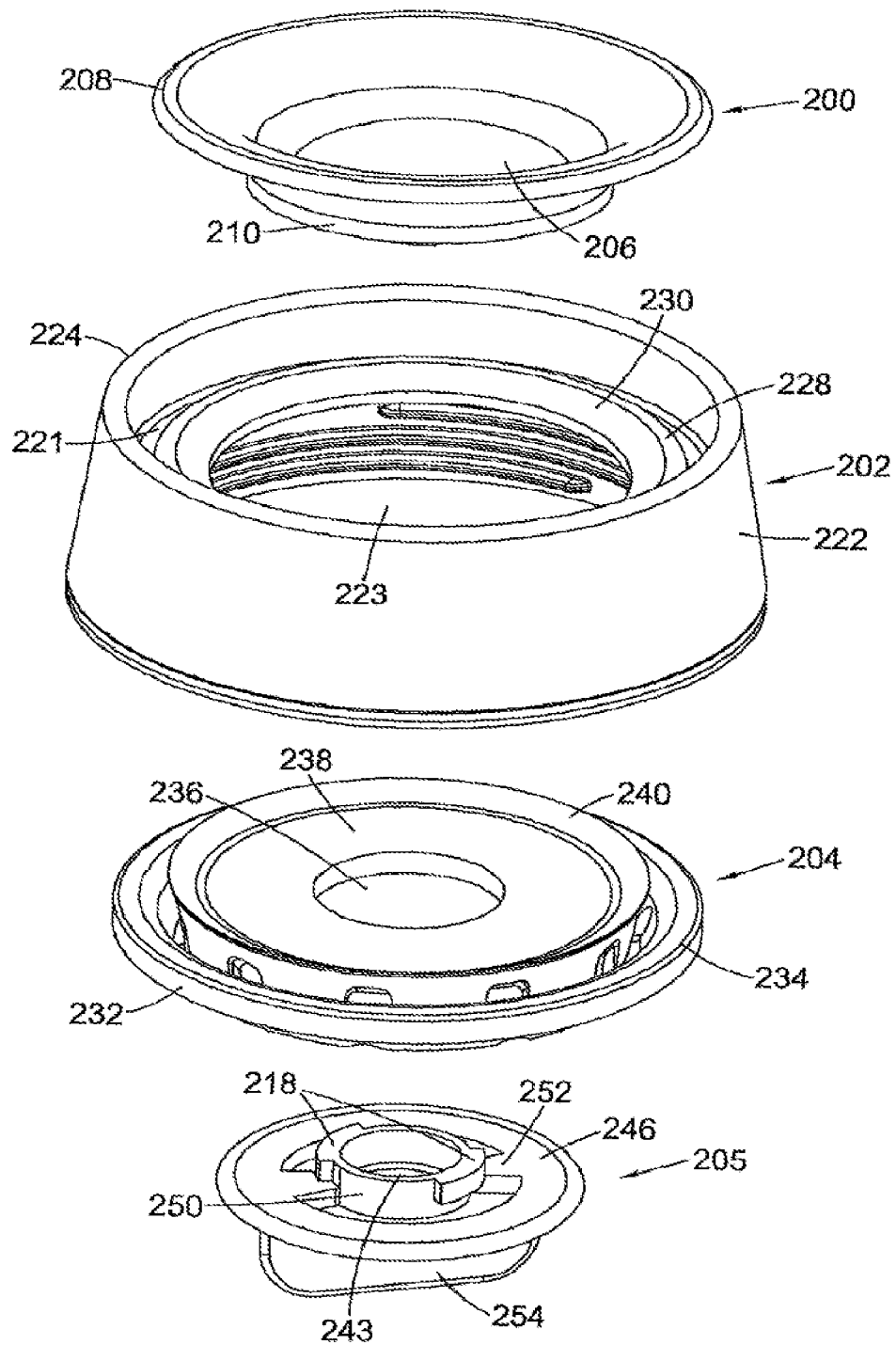
FIGS. 2a and 2b depict an exploded view of a valve assembly in accordance with a first embodiment of the present disclosure.
Figure 2B:
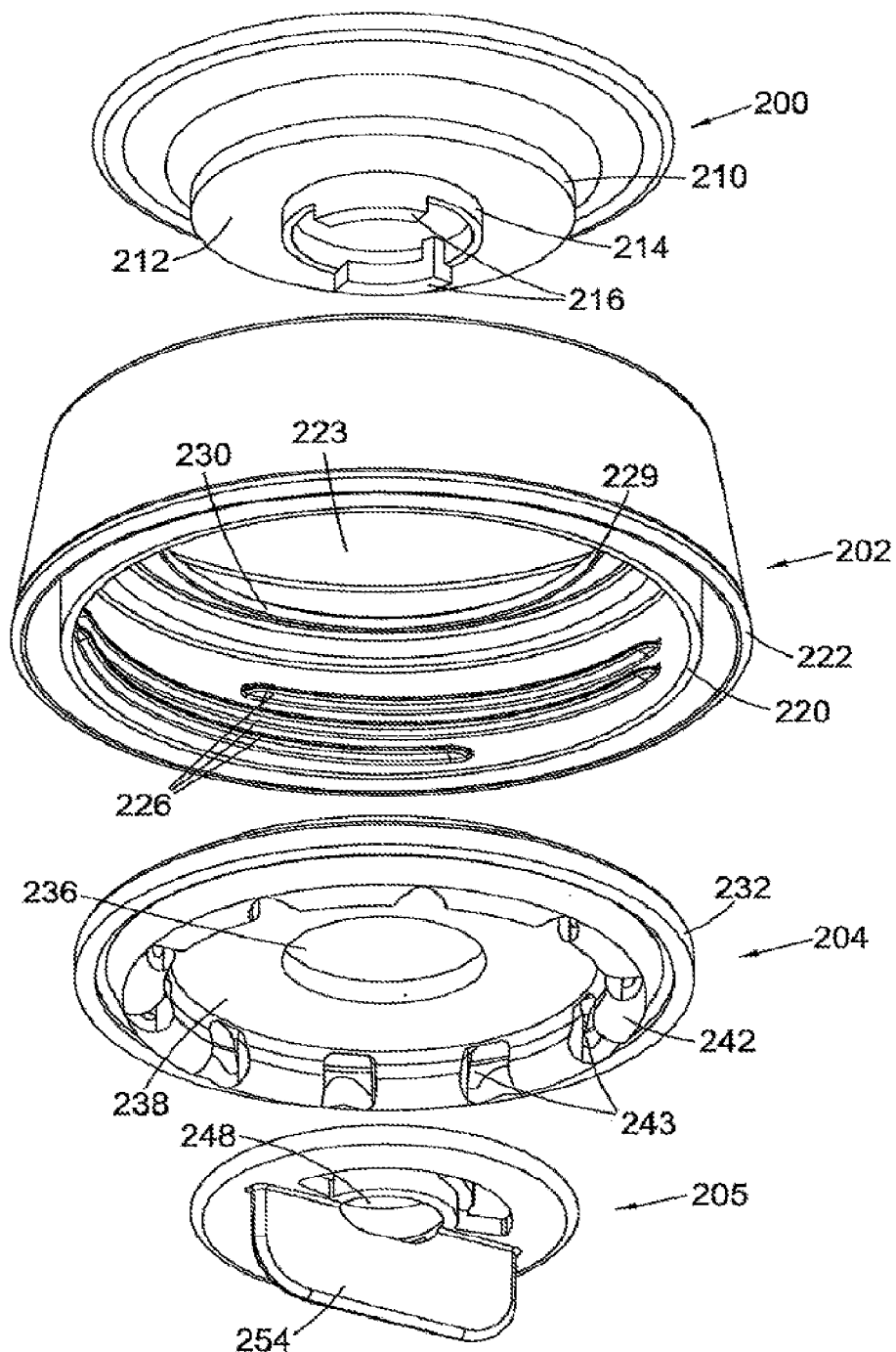

FIGS. 2a and 2b depict an exploded valve assembly for use with an infant drinking cup in accordance with a first embodiment of the present disclosure. The assembly comprises an actuating cap 200, a lid 202, a diaphragm 204, and a retainer 205, all of generally circular shape and co-axially mounted.

Figure 3:
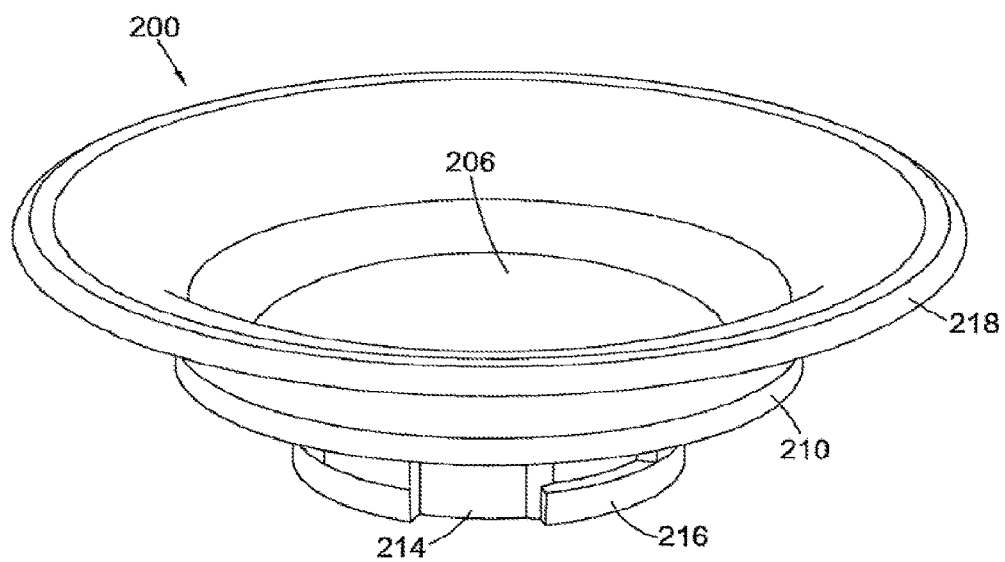
FIG. 3 depicts an actuating cap for a valve assembly in accordance with a first embodiment of the present disclosure.
Figure 4A:
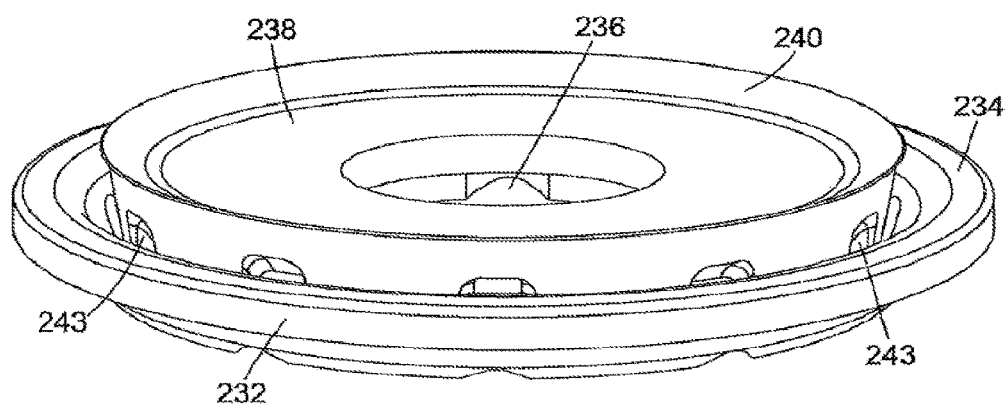
FIG. 4a depicts a diaphragm for a valve assembly in accordance with a first embodiment of the present disclosure.
Figure 4B:
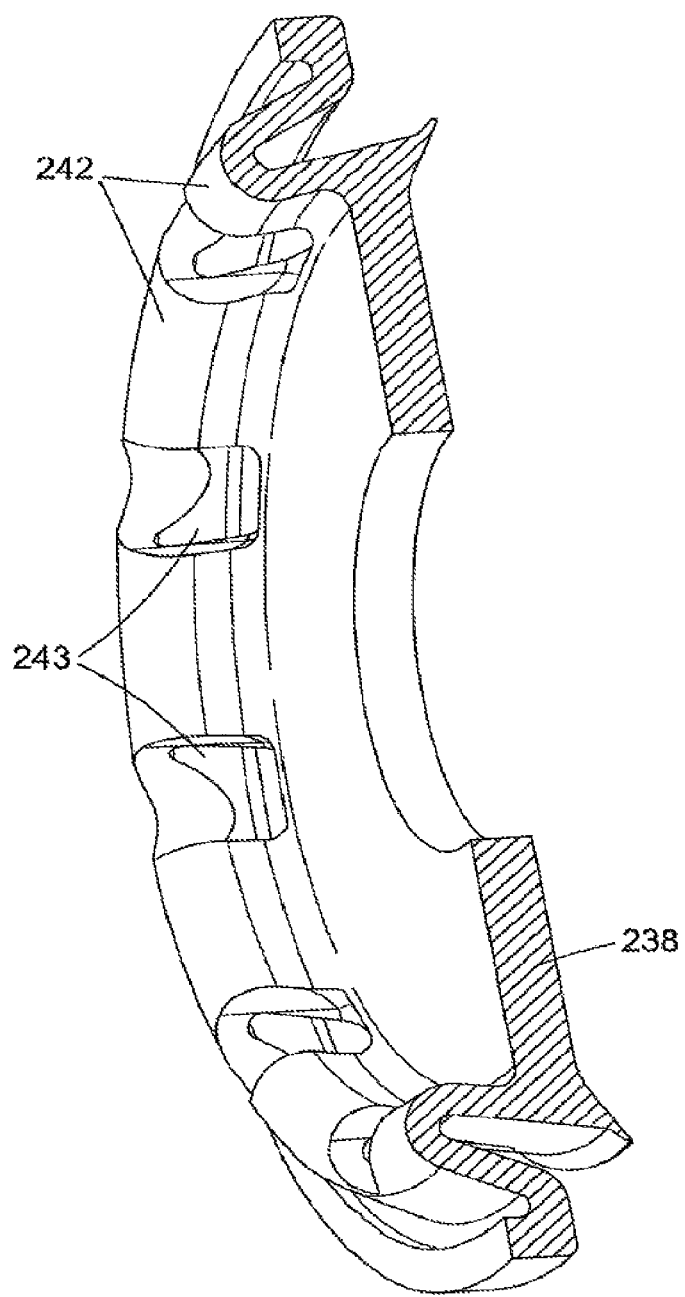
FIG. 4b depicts a cross section through a diaphragm for a valve assembly in accordance with a first embodiment of the present disclosure.
Figure 5A:
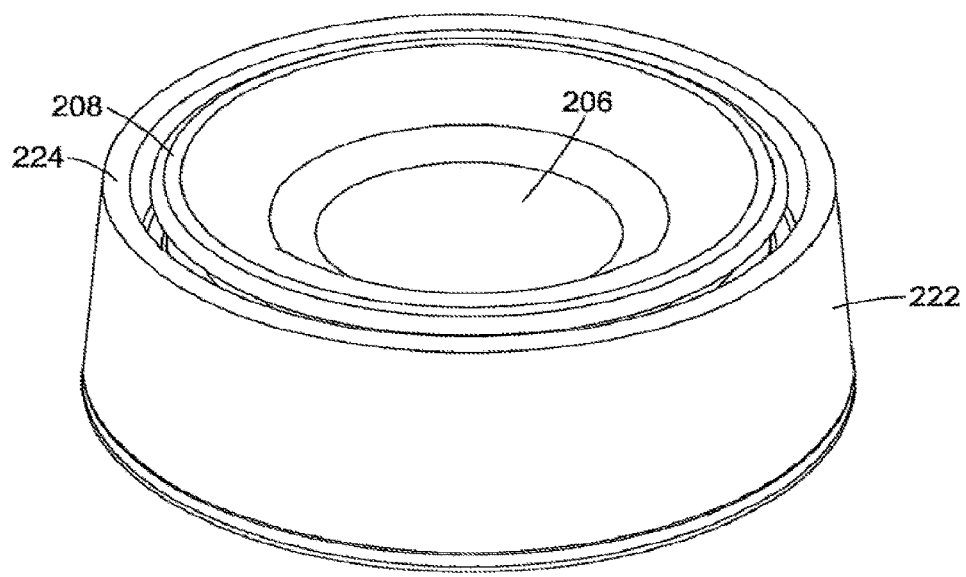
FIGS. 5a and 5b depict a valve assembly unattached to a cup, the valve assembly being in accordance with a first embodiment of the present disclosure.
Figure 5B:
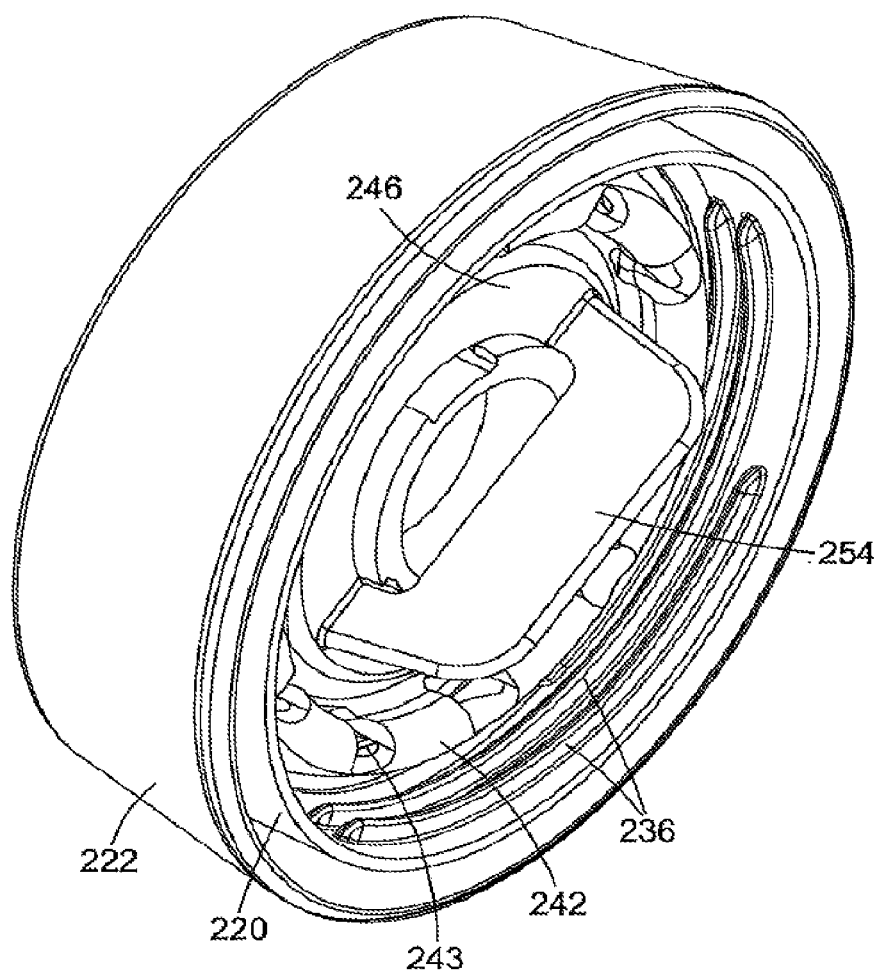
Figure 5C:
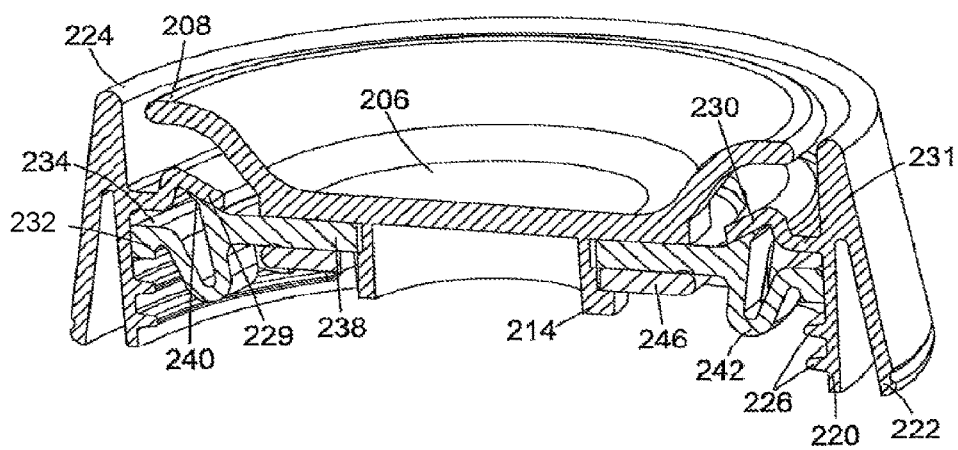
FIG. 5c depicts a cross section through a valve assembly unattached to a cup, the valve assembly being in accordance with a first embodiment of the present disclosure.

With reference to FIGS. 2a, 2b and 3, a top side of the actuating cap 200 has a top flat central face 206. The actuating cap flares outward and upward from the top flat central face 206 with a decreasing gradient, culminating in a flat outer rim 208. A cylindrical portion 210 depends from a bottom surface of the actuating cap. A bottom surface of the depending cylindrical portion has a bottom flat central face 212. A cylindrical shaft 214 depends from the bottom flat central face. The depending cylindrical shaft comprises two substantially L-shaped female interlockable members 216. The female interlocking members are designed to interlock with male interlocking members 218 on the retainer 205.

The lid 202 is generally conical in shape. The lid comprises an inner lid wall 220 and an outer lid wall 222. The inner lid wall defines a depending cylindrical portion. The outer lid wall extends from the inner lid wall to form a downwardly domed lid outer surface which surrounds the inner lid wall. The outer lid wall extends outwards and downwards in accordance with the substantially conical shape of the lid. The inner lid wall and the outer lid wall meet to form an annular rim 224. An inner surface of the inner lid wall includes a helical thread 226. The helical thread is for the purpose of attachment of the lid to a cup, bottle or vessel having a correspondingly threaded outer surface. An annular projecting wall 228 extends radially inwards from an inner surface of the inner lid wall 220 to define a flat perimeter region 221. The annular wall terminates in an annular angled surface 230. The annular projecting wall defines a lid central aperture. The angled surface is angled downward and inward 230 with respect to a central cylindrical axis of the assembly. The lower face of the angled surface thus forms an angled valve seat surface.

With respect to FIGS. 2a, 2b, 4a and 4b, the diaphragm has an outer depending cylindrical flange 232 at its periphery. At the top of the depending cylindrical flange is a flat peripheral annular surface 234. The diaphragm has a diaphragm central aperture 236. The diaphragm central aperture is substantially circular, and is defined by an annular, generally horizontal inner flange 238 of the diaphragm. The inner flange is substantially annular, and flares outwards and upwards at its outer periphery to form an angled annular valve face 240. The material which makes up the diaphragm thins towards the edge of the annular valve face. The annular valve face is angled downwardly with respect to a central cylindrical axis of the assembly. The annular valve face is angled downwardly slightly more toward the cylindrical axis of the valve assembly than the angled face 230 of the annular projecting wall for reasons which will be made clear later.

Connecting the inner flange 238 and the outer flat peripheral annular surface 234 is a folded section 242. The folded section is substantially U-shaped in vertical cross-section. The diaphragm 204 is formed from a resilient material. When flexed or otherwise bent out of shape, the resilient material of the folded section unrolls and seeks to return to its natural shape. In this way the folded section acts as a biasing means, the action of which will be explained later. The folded section is located substantially directly below the annular valve face. The biasing means is generally annular in plan view and is located between the peripheral annular surface and the annular valve face. The folded section further comprises apertures 244 through the diaphragm and around the length of the folded section.

With reference to FIGS. 2a and 2b, the retainer 205 comprises a flat ring 246 having a central aperture 248. A central cylindrical shaft 250 sits in the central aperture, and is joined to the flat ring by support ribs 252. The support ribs provide a strong structure, whilst the resulting gaps between the support ribs mean that the retainer is lightweight and cost effective with regard to material usage. The central shaft comprises two extending wings which form male interlocking members 218. The male interlocking members 218 of the cylindrical shaft and female interlocking members 216 of the depending cylindrical shaft of the actuating cap 200 form a bayonet interlocking mechanism, as is well known to those skilled in the art. A retainer fin 254 depends from a lower face of the flat ring.

With reference to FIGS. 2a, 2b, 3, 4a and 4b and 5a to 5c, the diameter of the depending cylindrical shaft 214 is less than a diameter of the diaphragm central aperture 236 and a diameter of the lid central aperture 223. To assemble the assembly, the depending cylindrical shaft is passed through the lid central aperture, and the cylindrical shaft of the retainer is passed through the diaphragm central aperture. The male 218 and female 216 interlocking members are interlocked by twisting such that the diaphragm inner flange 238 is clamped tightly between the bottom flat central face 212 of the actuating cap 200 and the flat ring 246 of the retainer. The clamping creates a water-tight seal. The actuating cap, lid, inner flange of the diaphragm and retainer are now coupled together via the action of the interlocking members. The retainer fixes the diaphragm inner flange 238 against flexing when the valve assembly is in operation, as will be described later. In this way, the retainer can be described as a fixing element or fixing formation.

When a user wishes to disassemble the assembly, he or she can simply uncouple the interlocking members by twisting the retainer. The relatively large retainer fin 254 makes this simple for a user, as he or she can easily grasp the retainer fin, twist the fin and hence the retainer, and decouple the interlocking members. This means that the constituent pieces of the assembly are easy to clean.

Figure 6:
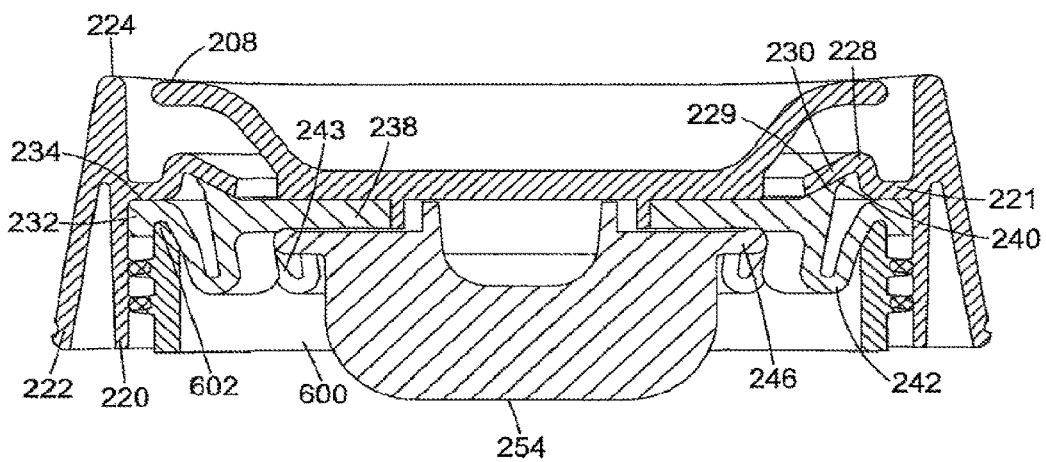
FIG. 6 depicts a cross section through a valve assembly in an assembled configuration, the valve assembly being in accordance with a first embodiment of the present disclosure.

FIG. 6 depicts a cross-section of an assembled configuration of the valve assembly in accordance with a first embodiment of the present disclosure. In the assembled configuration, the valve assembly is coupled to a cup 600 (partially shown). The assembly generally has circular symmetry. The valve assembly is detachably coupled to the cup by virtue of an outer surface of the cup having a helical thread which corresponds to the helical thread 226 of the inner surface of the lid or collar inner wall. As the cup is screwed into place to form the arrangement seen in FIG. 6, the outer peripheral annular surface 234 and the depending cylindrical flange 232 locate the diaphragm on an upper rim of the cup 602. As the valve assembly is screwed onto the cup 600, the diaphragm is clamped between the upper rim of the cup 602 and the underside of the flat perimeter region 221 of the projecting wall 228. The outer depending cylindrical flange of the diaphragm 232 is likewise clamped between an inner surface of the lid inner wall and an outer surface of the cup. This creates a seal between the underside of the annular projecting wall 228 and the upper rim of the cup 602. In this way a periphery of the diaphragm is anchored to a periphery of the cup.

The biasing means 242 is effectively pre-stressed when the assembly is screwed onto the cup, as the height of the valve face 240 and/or angle of the valve face 240 are sufficient to form an interfering fit with the valve seat surface 229 on the lid or collar 202. However, the outer projecting wall prevents upwards movement of the diaphragm as a whole, and therefore the folded section 242 is bent downwardly away from its natural shape, unrolling it slightly. Hence, in the assembled state depicted in FIG. 6, the diaphragm is biased by means of the folded section such that the annular valve face is pressed against the angled valve seat surface. The valve face 240 of the diaphragm 204 opposes the valve seat surface 229. This defines the rest, or closed, state of the valve.

The pre-stress or compression of the folded section can be fine-tuned by adjusting the original radius of the fold. Thus, valve assemblies according to the present disclosure provide valves which have a sealing strength which can be easily adjusted by the manufacturer to ensure a consistent biasing force every time the user screws the valve assembly onto the cup. Alternatively, by moulding the folded section 242 in different thicknesses, or by adding or removing material from the apertures 243 then the biasing force may be fine-tuned.

Manufacturers can also control the sealing strength provided by the valve by modifying the screw fit. By modifying the screw fit, the manufacturer can control the biasing force between the valve face and the valve seat surface.

It will also be appreciated that, as a user tightens the screw fit by turning the lid 202 with respect to the cup 600, the distance between the flat peripheral annular surface 234 and the flat perimeter region 221 is decreased. Also, the user tightens the screw fit, the harder these two surfaces press against the diaphragm 204. If the screw-fit is over tightened, this can cause unpredictable rotational friction or drag between the valve face 240 and the valve seat surface 229. The drag may cause the annular valve face to become twisted and distorted which may impair the valve's seal. In some embodiments, visual aids or markers are provided on an outer surface of the lid 202 and an outer surface of the cup 600. In a preferred embodiment, a first marker is placed on an outer surface of the cup 600, and a second marker is placed on an outer surface of the lid 202. These markers may take the form of, for example, circular dots or protrusions. The markers are positioned such that the manufacturer's preferred screw fit tightness is achieved when the markers are aligned.

The folded section 242 is located substantially underneath the annular valve face 240. The annular valve face 240 and the annular valve seat 229 are angled. The valve assembly is designed such that the folded section, in the rest state, presses the annular valve face upwards and inwards against the annular valve seat. The annular valve face extends in a direction more toward the vertical than the angled surface of the annular projecting wall. Consequently, when the biasing force pushes the annular valve face against the annular valve seat, the valve face is deformed by the rigid surface it contacts. As the diaphragm is made of resilient material, the annular valve face seeks to revert to its natural shape. The annular valve face therefore pushes against the annular valve seat surface. In this way, the annular valve face acts as a second biasing means.

As with the biasing force and sealing strength provided by the folded section 242, the biasing force and sealing strength provided by the annular valve face 240 can also be fine-tuned by the manufacturer. The manufacturer can control the qualities of the material which comprise the valve face, such as the rigidity and thickness of the material. Adjustments to these qualities allow control over the sealing force provided by the valve. For example, and as will be appreciated by the skilled person, increasing the rigidity or resilience of the material which comprises the annular valve face 240, either across the entire component part or just in the vicinity of the valve face, can increase the biasing force.

Providing two biasing means, each with their associated respective means by which to fine-tune the biasing force, allows manufacturers to more precisely control the biasing force and sealing strength provided by the valve assembly by tuning either, of both in conjunction with each other.

Figure 7A:
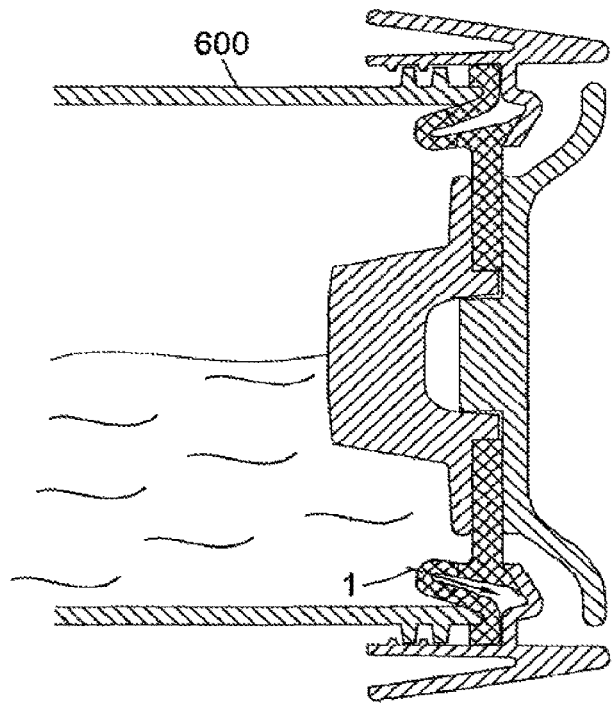
FIG. 7a depicts a closed state of a valve assembly attached to a cup, the valve assembly being in accordance with a first embodiment of the present disclosure.

When in the rest state, fluid in the cup is prevented from passing through the lid central aperture 223. The rest state is depicted in FIG. 7a. The constituent parts of the valve assembly are impermeable to liquid, and the pieces are generally coupled together to form water-tight seals such that fluid cannot pass between the annular valve face 240 and the annular valve seat surface 229 when the assembly is in the rest state. When the cup and valve assembly is tilted or up-ended, the fluid passes through the diaphragm apertures 243 to reach the annular valve face and annular valve seat surface, but fluid cannot pass between the two structures. This is depicted by arrow 1. It will be appreciated that the disclosed valve is a reverse seat type valve, meaning that liquid in the cup cannot push the valve open by impacting on the underside of the valve, and neither can any excess pressure within the cup act to open the valve. In fact, such pressure from inside the cup acts to increase the force of the biasing means, and press the valve face 240 against the valve seat surface 229 with greater force. Pressure from inside the cup thereby acts to strengthen the seal.

Figure 7B:
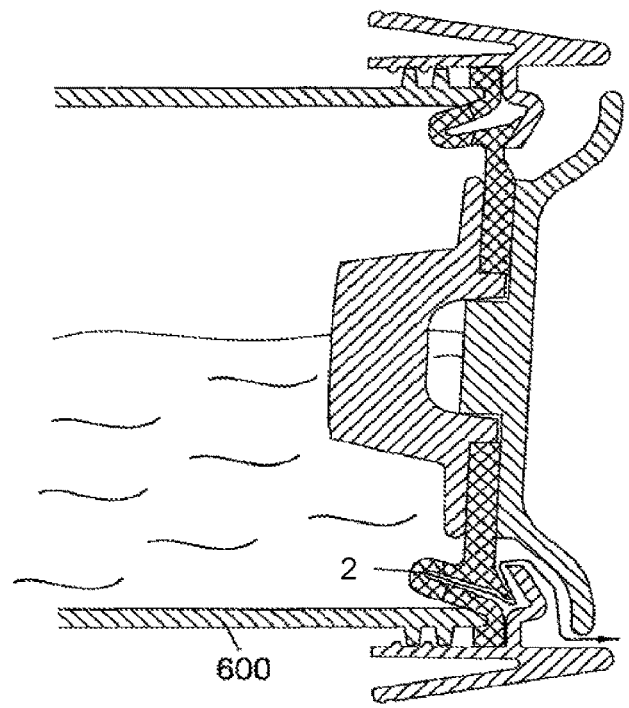
FIG. 7b depicts an open state of a valve assembly attached to a cup, the valve assembly being in accordance with a first embodiment of the present disclosure

An open state of the valve assembly is depicted in FIG. 7b. In use, a user can drink from any point around the outer rim of the actuating cap 200. When the user wishes to drink from the cup, the cup and valve assembly is tilted or upended. Liquid in the cup acts under gravity to pass through the diaphragm apertures 243. When a user puts their mouth to the outer rim of the actuating cap and applies contact pressure to the outer rim 208 of the actuating cap, the pressure pushes the outer rim of the actuating cap toward the annular projecting wall 228 in the vicinity of the user's mouth. As the actuating cap is coupled to the inner flange of the diaphragm, the inner flange of the diaphragm at the vicinity of the user's mouth pressure is also pushed downward. This action causes the annular valve face to move away from the annular valve seat surface. Thereby, a fluid flow path is created from the cup, through the apertures of the diaphragm, between the annular valve face and the annular valve seat surface, and into the user's mouth. This is depicted by arrow 2. This action also causes the folded section in the vicinity of the user's mouth to unroll to a greater extent. This places the biasing means under additional stress and this defines the open state of the valve assembly.

When the downward pressure on the actuator cap ceases, for example when the user stops drinking from the cup, the biasing means 242 seeks to return to its closed state. The folded section moves to again press the annular valve face against the annular valve seat surface. The fluid flow path defined in the open valve state is thereby blocked, and the valve assembly is returned to the rest position.

The components of the valve assembly can be formed in any appropriate manner, for example compression or injection moulding. The constituent pieces of the valve assembly can be formed of any appropriate plastics material. The actuating cap, lid and retainer can be formed of any appropriate rigid plastics material, such as thermoplastic materials such as polypropylene PP, polycarbonate PC or similar material blends as appropriate. The resilient diaphragm can be formed from any appropriate resilient, flexible material such as silicone, latex or a thermoplastic elastomer (TPE).

As will be appreciated by those skilled in the art, the components of the valve assembly can also be produced via additive manufacturing, for example via the use of a 3-D printer. First, a computer-readable file containing data representative of a valve component is produced. The data may be representative of the geometry of successive cross-sections of the component. This data is often called 'slice' or 'layer' data. The data can be produced from a CAD-style file, or via the use of a 3-D scanner. A 3-D printer can then successively lay down layers of material in accordance with the cross-section data to produce the valve components.

The fact that the diaphragm is anchored around its circumference means that the diaphragm inner flange has a large amount of freedom of movement but this movement is controlled. The diaphragm inner flange, and the components coupled to it, can displace easily but will still be effectively leak-proof when in the rest position. This functionality allows the valve assembly to be responsive to local lip pressure, and allows a user greater control over the flow rate of the valve.

The folded section, which acts as a biasing means, is substantially cylindrical and presses the annular valve face upwards and inwards to meet the annular valve seat surface from the entirety of the circumference of the valve assembly. Therefore, the effect of unwanted forces which could act to open the valve are minimised. The biasing means is arranged to be anchored, in the assembled configuration, via the diaphragm to the periphery of the cup, as described above. This defines an anchoring location. The valve face and valve seat surface are located radially inward from the anchoring location. The diaphragm acts as a type of suspension system, which keeps the valve closed whilst any shocks or vibrations are dampened. As the diaphragm is anchored around its periphery rather than at its centre, permitting the biasing means to be located radially outwardly of the centre. The effect of bending moments at the periphery of a circular structure, for example the circular valve member in the prior art structure of FIGS. 1a and 1b, is diminished. These bending moments are hence much less likely to open the valve. Therefore, the valve is less likely to leak when the assembly is shaken, dropped, or inverted.

The diaphragm and annular valve face are made of flexible material. No rigid supporting structure is required to anchor the biasing means or valve face to a central portion. Instead, the annular valve face is held against the annular valve seat surface around the periphery. Therefore 'drooping' of a circular central valve member, a common occurrence in the prior art i.e. the prior art arrangement depicted in FIGS. 1a and 1b, is avoided. The previous rigid valve members necessarily provided a valve which opened to allow a large volume of fluid from the cup. However, because the biasing means is intermediate the centre and rim in the disclosed arrangement the flexible annular valve face is only lifted from the annular valve seat surface in a region underneath the user's lips, i.e. the valve is opened at a region very localised to the user's lip pressure. This allows a user greater control over the flow rate of the valve, and prevents fluid from spilling around the edges of an infant's mouth.

As previously detailed, the angled nature of the annular valve face provides the valve assembly with a second biasing means. Any positive pressure from the cup acts to push the annular valve face upwards, but also radially outwards. In this way, not only is the sealing force between the annular valve face and the annular valve seat surface increased, the area of the annular valve face in contact with the annular valve seat surface is increased. In this way, positive pressure in the cup acts to strengthen the seal of the valve by increasing the sealing force and also the effective sealing area of the valve. Additionally, the valve face angle is slightly greater than the valve seat angle further increasing the additional bias.

The annular valve face biases substantially radially inwards, and the folded section biases substantially upwards. These directions are perpendicular to each other, and in this way the valve is dampened against movement or vibrations in all directions. For example, a sharp downwards and upwards movement of the assembly could, if performed quickly enough, overcome the biasing force provided upwards by the folded section. However, this action will not break the seal, as the second biasing means provided by the annular valve face acts radially inwards. The force resolved radially inwards is unaffected. Even if the diaphragm is urged to move downwards as a whole in response to the upwards and downwards shaking, the annular valve face acts to grip the annular valve seat surface and therefore keep the seal in force.

Whilst the invention has been described in connection with preferred embodiments, it is to be understood that the invention is not limited to these embodiments, and that alterations, modifications, and variations of these embodiments may be carried out by the skilled person without departing from the scope of the invention.

It will be appreciated that embodiments of the present disclosure may have just one of the two described biasing means. Either would be sufficient to form a valve assembly with at least some of the above described advantages.

Embodiments are envisaged where the elements which form the valve assembly, for example the valve seat surface and valve face, are not generally circular or annular. These valve elements could have cross-sections forming a circular sector with any defining central angle. In some such embodiments, a user is restricted to drinking from a corresponding circular sector of the actuating cap. However in other embodiments, a user could still drink from around the entirety of the outer rim of the actuating cap, as long as the action of the actuating cap opens a portion of the valve which fluid can then pass through. Also, in some embodiments the valve assembly has a cross-section of an n-sided regular polygon. For example, a valve assembly in accordance with the above teachings could have a generally hexagonal cross-section. It will be appreciated that as the value of 'n' increases, the polygon will be a better approximation to a circle, allowing most or all of the functionality and advantages described herein.

In some embodiments, the diaphragm is not formed entirely of resilient material. Embodiments are envisaged wherein just the folded section is formed from a resilient material, or just the folded section and the annular valve face are formed from a resilient material. The remaining diaphragm can then be formed from a rigid plastics material, providing increased rigidity and support to the structure. Additionally, the aperture may be located elsewhere than in the folded section as long as they provide a fluid passage to the seal.

It will be appreciated that other means of attaching the assembly to a cup are possible, for example bayonet mounts, as long as the resulting detachable coupling provides a water-tight seal. Similarly, the male and female bayonet fixtures can be interchanged, and indeed the components of the valve can be assembled and detachably coupled together using any suitable means.

In some embodiments, the retainer is unnecessary. Instead, the actuator can be coupled to the diaphragm and/or biasing means by any reasonable method. For example, the actuating cap could be permanently attached to the diaphragm. Alternatively, the actuating cap and diaphragm could be formed as the same structure, and therefore could be considered as a single component. In other embodiments, the diaphragm can be permanently attached to or integral with the retainer. Such a valve element would couple itself to the actuator, without the need for a separate retainer.

Similarly, the biasing means does not have to be anchored to the periphery of the cup by virtue of a clamping arrangement between a lid inner surface and a cup outer surface. The diaphragm could be glued or otherwise fixed in place. Many such alterations would be obvious to those skilled in the art without departing from the principles of the present disclosure.

Figure 8A:
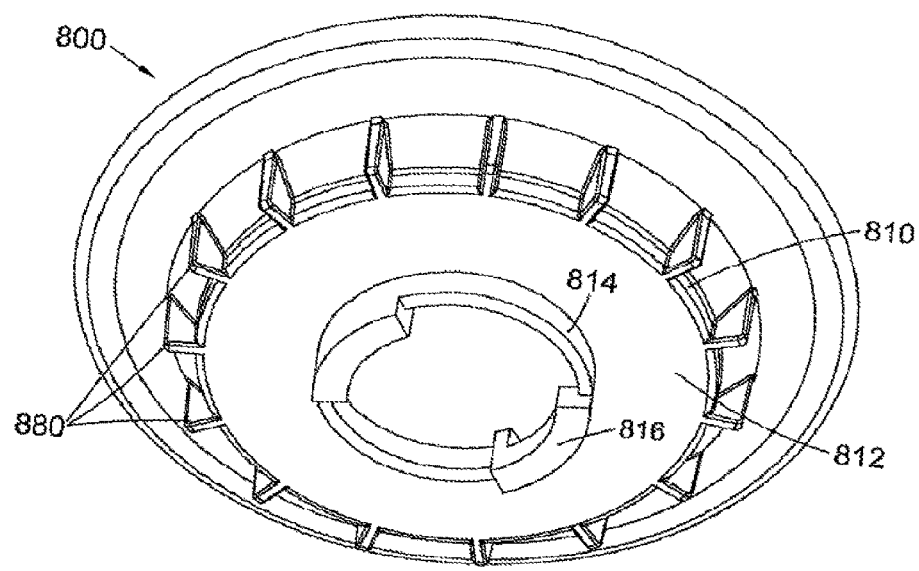
FIG. 8a depicts an actuating cap in accordance with a second embodiment of the present disclosure.
Figure 8B:
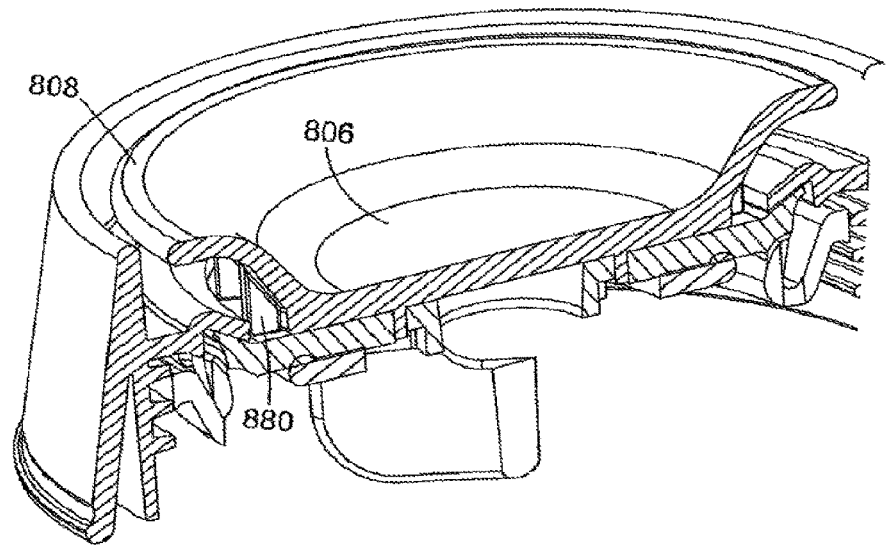
FIG. 8b depicts a cross-section through a valve assembly unattached to a cup, the valve assembly being in accordance with a second embodiment of the present disclosure.

FIGS. 8a and 8b depict another embodiment of the present disclosure. In this embodiment, the actuating cap 800 has an outer rim 808, a top flat central face 806, a depending cylindrical portion 810, a bottom flat central face 812 and a depending cylindrical shaft 814. The actuating cap is further provided with a number of extending ribs 880 (FIG. 8a). The ribs 880 extend from an outer surface of the depending cylindrical portion 810. The base portions of the extending ribs sit substantially level with the bottom flat central face 812 of the actuating cap 800. When the diaphragm is clamped between the retainer and the flat bottom central face 812, the ribs also contact the diaphragm.

The provision of extending ribs moves the radially outermost contact point between the actuating cap and the diaphragm from the perimeter of the flat bottom central face to the outermost point of the extending ribs. This means that any force applied to the actuating cap acts on the diaphragm at the outermost point of the extending ribs 880, rather than the perimeter of the cylindrical portion 810. The ribs 880 thereby have the purpose of increasing the moment of force applied to the diaphragm for a given force applied by a user at the outer rim 808 of the actuating cap 800. The valve can thus be made more sensitive to lip pressure on the actuating cap from a user. The amount that the ribs extend can be chosen by the manufacturer to fine-tune the responsiveness of the valve.

The ribs 880 also act, when the valve assembly is in an open state, to channel fluid from the cup, via the fluid flow channel, to the user's mouth. Fluid is thus made to flow directly from the opened section of the valve straight into the user's mouth, rather than spread around a cavity between the lid and the cap.

Figure 9:
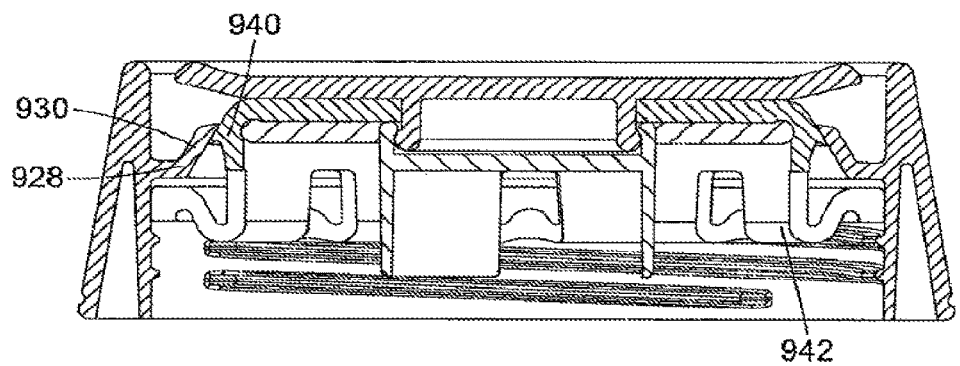
FIG. 9 depicts a cross-section through a valve assembly unattached to a cup, the valve assembly being in accordance with a third embodiment of the present disclosure.

FIGS. 9 and 10 show further embodiments of the disclosed valve assembly. The operation of these valves is similar to previously described embodiments. In these embodiments, the angled surface 930 of the lid annular projecting wall 928 is angled inwards and upwards. The annular valve face 940 is similarly angled.

Figure 10A:
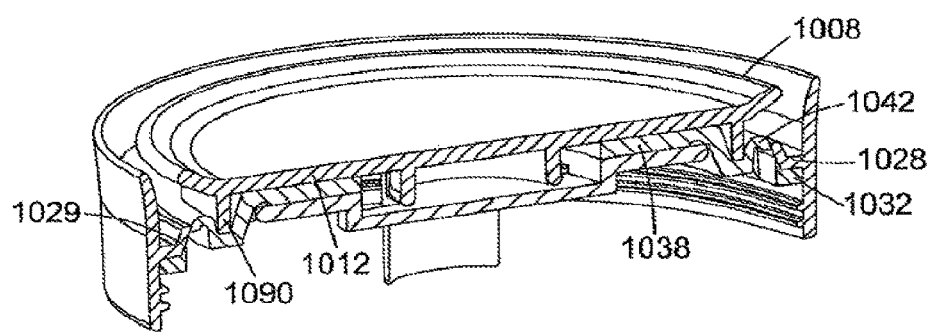
FIG. 10a depicts a cross-section through a valve assembly unattached to a cup, the valve assembly being in accordance with a third embodiment of the present disclosure.

FIG. 10a depicts a third embodiment of the present disclosure. In the third embodiment, a second cylindrical structure 1090 depends from the bottom flat central face 1012 of the actuating cap 1000. This depending cylindrical structure has a similar purpose to the extending ribs of previous embodiments, i.e. acts to move the outermost point of contact between the actuating cap and the diaphragm radially outwards to provide a valve assembly more responsive to lip pressure on the actuating cap by a user.

Figure 10B:
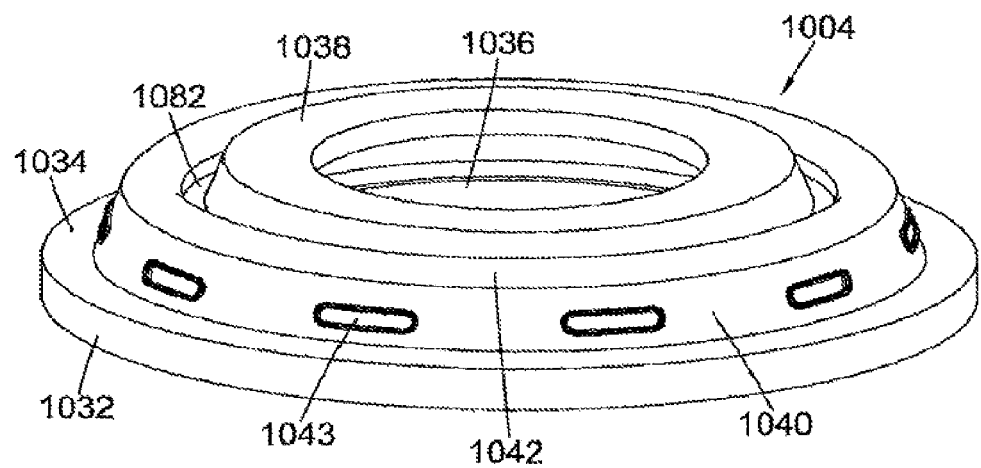
FIG. 10b depicts a diaphragm for a valve assembly in accordance with a third embodiment of the present disclosure.
Figure 10C:
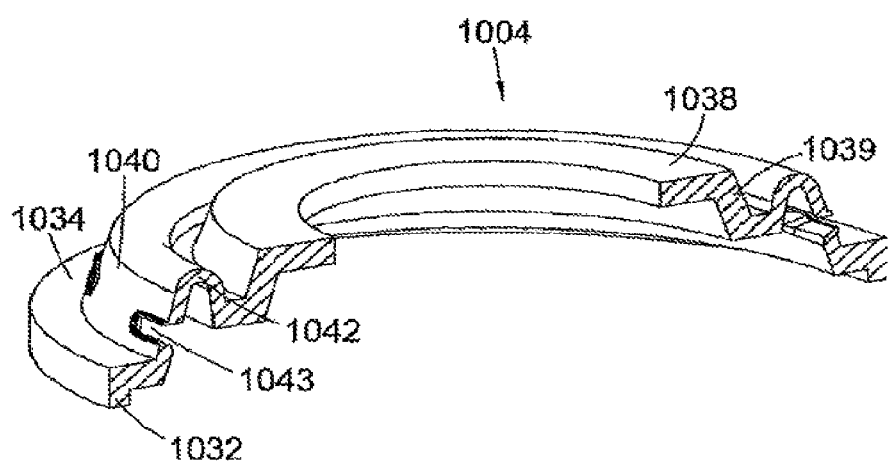
FIG. 10c depicts a cross section through a diaphragm for a valve assembly in accordance with a third embodiment of the present disclosure.

FIG. 10b depicts a diaphragm 1004 in accordance with the third embodiment, and FIG. 10c depicts a cross section through the diaphragm of the third embodiment. The diaphragm comprises a central aperture 1036, and, radially outwardly therefrom, an inner circular flange 1038 extending from the top of a generally vertical or frusto-conical wall 1039. The diaphragm also comprises an annular groove 1092 between the vertical wall 1039, and an inverted U-shaped (in cross-section) folded section 1042. The outer wall of the folded section provides or extends to a generally vertical valve face 1040. The diaphragm further comprises an outer depending cylindrical flange 1032 and a peripheral annular surface 1034. In this embodiment, the folded section 1042 is inverse of the folded section 242 of the first embodiment, but performs the same function of, when the valve constituent parts are assembled, pressing the valve face 1040 into a valve seat surface 1029, acting as a biasing means.

In this embodiment, the folded section 1042 comprises the valve face 1040. The folded section 1042 comprises a plurality of apertures. When the valve assembly of the third embodiment is assembled as detailed above with regard to the first embodiment, the second depending cylindrical structure 1090 of the actuating cap 1000 slots into the annular groove 1092. When the valve assembly is attached to a cup, the outer depending cylindrical flange 1032 is anchored at the periphery of the cup. A flat perimeter region of the projecting wall 1028 of the lid and a top rim of the cup clamp the diaphragm in place around its edge. In a rest position, the apertures 1043 are pressed against the valve seat surface 1029, such that fluid from the cup cannot pass through the apertures.

In operation, when a user presses his or her lips to an outer rim 1008 of the actuating cap and hence imparts a downwards force thereto, the depending cylindrical portion 1090 imparts the force to the diaphragm 1004. This pushes the diaphragm downwards, and hence the valve face 1040 is moved away from the valve seat surface 1029. This places the folded section of the diaphragm under stress, and defines an open condition. Fluid from the cup can flow through the apertures 1043 in the valve face 1040 and hence can pass into the mouth of a user. When the downward pressure ceases, the folded section 1042 acts to push the valve face 1040 back against the valve seat surface 1029, thereby blocking fluid flow through the apertures 1043 and returning the valve assembly to the rest state.

The folded section 1042 of the third embodiment is in the opposing direction to the folded sections 242 and 942 of the two embodiments in FIGS. 2 to 9. In FIGS. 10 the folded section 1042 points towards the cap 1000 whereas in the other embodiments the folded sections 242 and 942 both point away from their respective caps. It will be appreciated that where the folded sections are in opposing directions then the respective biasing forces are generated in slightly different manners. So, in the valve embodiment in FIGS. 10, when the valve is in the open position the folded section 1042 is rolled more tightly to provide the biasing force necessary to close the valve. By contrast, in the valve embodiments in FIGS. 2-9 it is the unrolling of folded sections 242 and 942 when the valve is open that provides the biasing force. Nevertheless, in all embodiments, the biasing force in the folded section acts to close the valve when the user stops drinking.

It will be appreciated that aspects of the various embodiments can be interchanged as appropriate. It will be further appreciated that the valve assembly can be implemented in any appropriate vessel, including infant feeding vessels, child and adult drinking vessels and so forth.

The invention claimed is:

1. A valve assembly for a feeding or drinking vessel, the valve assembly comprising:
   a valve seat surface;
   a diaphragm having a valve face opposing said valve seat surface, a center axis and a cylindrical flange;
   a biasing element configured such that, in a rest position, the valve face is biased against the valve seat surface, wherein the biasing element includes a folded resilient section arranged to move the assembly from the rest position; and
   an actuator arranged to transmit a force to move the valve face from the rest position upon the application of contact pressure from a user's lips;
   wherein the cylindrical flange is arranged to be anchored, and the biasing element is arranged intermediate the center axis and the cylindrical flange.

2. The assembly of claim 1 wherein the biasing element is integral with the diaphragm and the valve face is located radially inward from the rim.

3. The assembly of claim 2 wherein the diaphragm further comprises a resilient diaphragm.

4. The assembly of claim 3 wherein the biasing element comprises a folded section of the resilient diaphragm, in which the folded section is U-shaped in cross section.

5. The assembly of claim 4 in which the folded section is configured to partially unroll when moved from the rest position.

6. The assembly of claim 1 wherein the valve seat surface is downwardly facing and the valve face is biased upwardly towards the valve seat surface.

7. The assembly of claim 5 wherein the biasing element includes at least one aperture.

8. The assembly of claim 1, wherein the actuator and the biasing element are detachably coupled.

9. The assembly of claim 8 further comprising a retainer acting to detachably couple the actuator and biasing element.

10. The assembly of claim 1 further comprising a collar mountable to a feeding or drinking vessel wherein the collar further comprises an inwardly projecting wall forming, on its underside, the valve seat surface.

11. The assembly of claim 10 wherein the cylindrical flange is arranged to be anchored to a rim of a feeding or drinking vessel.

12. The assembly of claim 10 wherein the cylindrical flange is arranged to be anchored between a rim of a feeding or drinking vessel and the collar.

13. The assembly of claim 10, wherein the collar further includes a first marker positioned on an outer surface of the collar and being further positioned to align with a second marker on an outer surface of a feeding or drinking vessel when the collar and vessel are in a first rotational alignment.

14. The assembly of claim 1 wherein the valve seat surface is angled downwardly, inwardly.

15. The assembly of claim 14 wherein the valve face is angled inwardly downwardly with the inward, downward angle of the valve face being greater than that of the valve seat surface.

16. The assembly of claim 1 further comprising a fixing formation for fixing a portion of the diaphragm intermediate the center axis and the biasing element against flexing.

17. The assembly of claim 1 wherein the diaphragm center is free to move from the rest position.

18. A valve assembly for a feeding or drinking vessel, the valve assembly comprising:
   a downwardly facing valve seat surface;
   a diaphragm having a valve face opposing said valve seat surface; and
   a biasing element configured such that, in a rest position, the valve face is biased upwardly towards and against the valve seat surface, wherein the biasing element comprises a folded resilient section of the diaphragm arranged to partially unroll when moved from the rest position.

19. The valve assembly of claim 18 wherein the diaphragm defines a central axis, the valve seat surface and valve face being inwardly downwardly angled towards said axis when the valve assembly is in an upright orientation, such that positive pressure from within the vessel acts to increase a sealing force between the valve face and the valve seat surface.

20. The valve assembly of claim 1 wherein
   the biasing element is configured to bias the valve face.

* * * * *